(12) United States Patent
Kosaka

(10) Patent No.: US 10,028,038 B2
(45) Date of Patent: Jul. 17, 2018

(54) COMMUNICATION CONTROL DEVICE

(71) Applicant: Kabushiki Kaisha Toshiba, Minato-ku, Tokyo (JP)

(72) Inventor: Hidenori Kosaka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 106 days.

(21) Appl. No.: 15/102,687

(22) PCT Filed: Apr. 14, 2014

(86) PCT No.: PCT/JP2014/060650
§ 371 (c)(1),
(2) Date: Jun. 8, 2016

(87) PCT Pub. No.: WO2015/087560
PCT Pub. Date: Jun. 18, 2015

(65) Prior Publication Data
US 2017/0026724 A1 Jan. 26, 2017

(30) Foreign Application Priority Data
Dec. 13, 2013 (JP) .................................. 2013-258594

(51) Int. Cl.
*H04Q 9/02* (2006.01)
*G06F 21/30* (2013.01)
(Continued)

(52) U.S. Cl.
CPC .............. *H04Q 9/02* (2013.01); *G06F 21/30* (2013.01); *G06F 21/60* (2013.01); *G06F 21/70* (2013.01); *H04Q 9/00* (2013.01)

(58) Field of Classification Search
CPC .. H04Q 9/02; H04Q 9/00; G06F 21/30; G06F 21/60; G06F 21/70
See application file for complete search history.

(56) References Cited

U.S. PATENT DOCUMENTS

2006/0082450 A1\* 4/2006 Hiratsuka ............. G06F 11/076
340/438
2012/0071215 A1\* 3/2012 Bourque ................. G06F 1/266
455/573
(Continued)

FOREIGN PATENT DOCUMENTS

JP         S62-179264 A      8/1987
JP         2003-087872 A     3/2003
(Continued)

OTHER PUBLICATIONS

International Search Report mailed by Japan Patent Office dated May 29, 2014 in the corresponding PCT application No. PCT/JP2014/060650—6 pages.
(Continued)

*Primary Examiner* — Theodore C Parsons
*Assistant Examiner* — Carlos Manuel De Jesus Lassala
(74) *Attorney, Agent, or Firm* — Knobbe, Martens, Olson & Bear, LLP

(57) ABSTRACT

A communication control device of an embodiment includes a converter and a controller. The converter is input with a second digital data signal prior to input of a first digital data signal and outputs an analog data signal which is an analog signal converted into from the second digital data signal. The first digital data signal is output to a destination device. The controller invalidates the first digital data signal when a voltage corresponding to the analog data signal does not coincide with a predetermined output permission voltage and validates the first digital data signal when the voltage corresponding to the analog data signal coincides with the output permission voltage.

7 Claims, 4 Drawing Sheets

(51) Int. Cl.
*G06F 21/60* (2013.01)
*G06F 21/70* (2013.01)
*H04Q 9/00* (2006.01)

(56) References Cited

U.S. PATENT DOCUMENTS

2014/0225622 A1* 8/2014 Kudo .................... B60L 3/0046
324/433
2014/0312709 A1* 10/2014 Nakano .................... H02J 5/005
307/104

FOREIGN PATENT DOCUMENTS

| JP | 2006-277499 | * 10/2006 |
| JP | 2006-277499 A | 10/2006 |
| JP | 2012-106596 A | 6/2012 |
| WO | WO 2011/118034 A1 | 9/2011 |

OTHER PUBLICATIONS

Written Opinion mailed by Japan Patent Office dated May 29, 2014 in the corresponding PCT application No. PCT/JP2014/060650 (Japanese language only)—4 pages.

* cited by examiner

COMMUNICATION CONTROL DEVICE

CROSS-REFERENCE TO RELATED APPLICATIONS

This application is national stage application of International Application No. PCT/JP2014/060650, filed Apr. 14, 2014, which designates the United States, incorporated herein by reference, and which claims the benefit of priority from Japanese Application No. 2013-258594, filed on Dec. 13, 2013, the entire contents of which are incorporated herein by reference.

FIELD

An embodiment of described herein relates generally to a communication control device.

BACKGROUND

Some turbine monitoring instruments used for measuring vibration, eccentricity, elongation, or elongation difference of a rotor, casing, or the like of turbine generators or electric pumps for nuclear or thermal power generation or private power generation employ a cybersecurity function. Generally, a turbine monitoring instrument measures vibration of a revolving shaft or a casing in a turbine generator or electric pump or elongation or elongation difference of the revolving shaft in the turbine generator or electric pump, or the like. Moreover, the turbine monitoring instrument transfers, to a host control device such as a distributed control system (DCS) or electric hydraulic control (EHC) disposed in a remote place, information related to a measurement result (e.g. measurement value or alarm) of vibration of the revolving shaft or casing in the turbine generator or electric pump or elongation or elongation difference of the revolving shaft in the turbine generator or electric pump, or the like.

Some of cybersecurity functions employed to the turbine monitoring instruments ensure security by permitting change of setting values only when a password is input to a personal computer (PC) that can change the setting values having been set to the turbine monitoring instrument (monitor) and the input password is correct.

Alternatively, some of cybersecurity functions employed to turbine monitoring instruments ensure security by providing a hardware key for setting setting values or the like to the turbine monitoring instrument and thereby changing setting values only when an operator operates the hardware key for settings to cause the turbine monitoring instrument to be switched over to a RUN state, where the setting value or the like can be changed.

Furthermore, in recent years, a host control device, storing data digitalized from the measurement result or the like by the turbine monitoring instrument, monitors at all times the turbine monitoring instrument connected thereto via a network. In such circumstances, especially in a nuclear power plant or the like, important devices (such as turbine monitoring instruments) are targeted in cyber-attacks more frequently.

With a cybersecurity function using a password, however, once the password is solved, setting values having been set to a turbine monitoring instrument may be easily changed and thus a monitoring target of the turbine monitoring instrument may fall into chaos. Alternatively, a cybersecurity function using a hardware key for settings requires key operation to cause the RUN state with the hardware key for settings every time the setting values or the like having been set to the turbine monitoring instrument are changed and management or the like is required for the hardware key for settings to prevent losing or the like of the hardware key for settings. Moreover, when a spare key is produced, it becomes difficult that the hardware key for settings plays a role as the cybersecurity function.

In general, an according to an embodiment, a communication control device is provided with a converter and a controller. The converter is input with a second digital data signal prior to input of a first digital data signal and outputs an analog data signal which is an analog signal converted into from the second digital data signal. The first digital data signal is output to a destination device. The controller invalidates the first digital data signal when a voltage corresponding to the analog data signal does not coincide with a predetermined output permission voltage and validates the first digital data signal when the voltage corresponding to the analog data signal coincides with the output permission voltage.

DETAILED DESCRIPTION

A cybersecurity system employing a communication control device according to the present embodiment will be described below with the accompanying drawings.

First Embodiment

Figure 1:
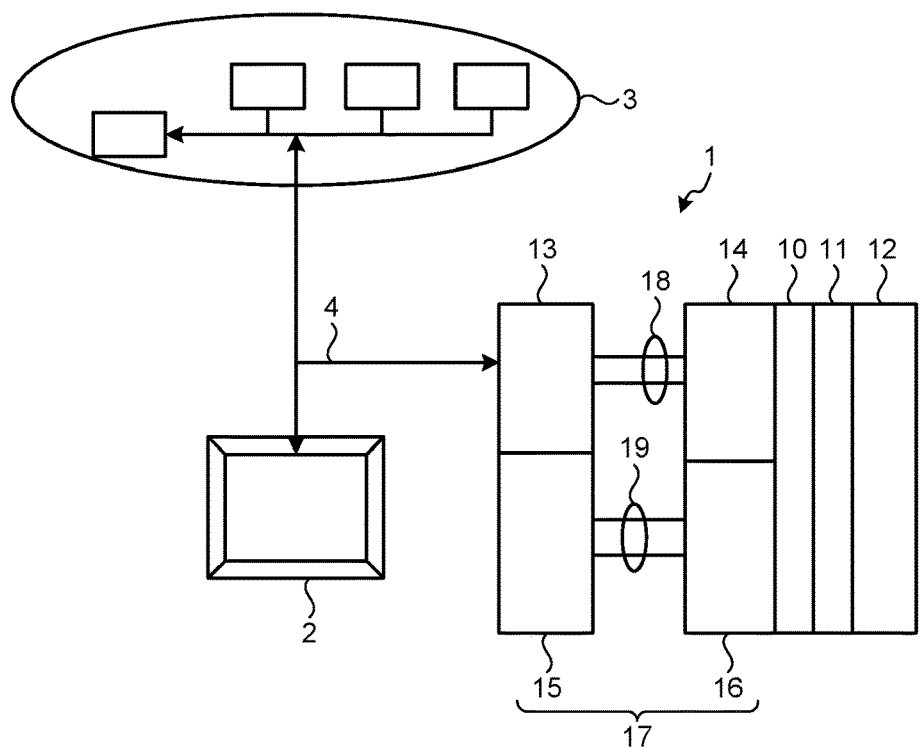
FIG. 1 is a block diagram illustrating a configuration of a cybersecurity system according to a first embodiment.

FIG. 1 is a block diagram illustrating a configuration of a cybersecurity system according to a first embodiment. The cybersecurity system according to the present embodiment includes, as illustrated in FIG. 1, a monitoring device 1 for monitoring a monitoring target device such as a turbine generator or an electric pump for nuclear or thermal power generation or private power generation, a personal computer (PC) 2 for transmitting, to the monitoring device 1, various data such as setting data used for changing various settings having been set to the monitoring device 1 or an alarm value used for alarm notification, and a host controller 3 (e.g. distributed control system (DCS) or electric hydraulic control (EHC)) connected to the monitoring device 1 via a host network such as the Internet and capable of transmitting various data such as setting data for the monitoring device 1. In the present embodiment, the monitoring device 1 and the PC 2 are connected with each other via a communication cable 4 and capable of communicating in accordance with a communication standard such as Ethernet (registered trademark) or RS2320.

The monitoring device 1 includes, as illustrated in FIG. 1, monitors 10 and 11 including a turbine monitoring instrument or the like for measuring vibration, eccentricity, elongation, elongation difference, revolution, etc. of a rotor, casing, or the like included in a monitoring target device, a power source device 12 for supplying power to the monitors 10 and 11, a first reception control unit 13 for receiving a data signal of setting data or the like from an external device (such as the PC 2 and host control device 3 in the present embodiment), a second reception control unit 14 which is connected to the first reception control unit 13 via a communication cable 18 such as a two-line cable, which supplies power to the first reception control unit 13, and which performs data analysis of the data signal received from the first reception control unit 13, a first transmission control unit 15 for transmitting measurement data showing a measurement result by the monitors 10 and 11 to the external device, and a second transmission control unit 16 which is connected to the first transmission control unit 15 via a communication cable 19 such as a two-line cable, which supplies power to the first transmission control unit 15, and which controls transmission of the measurement data by the first transmission control unit 15 to the external device.

The first and second reception control units 13 and 14 and the first and second transmission control units 15 and 16 are connected between the monitoring device 1 (exemplary destination device) and the external device (source device) and thereby function as a communication control device 17 for controlling communication of the monitoring device 1 with the external device. In the present embodiment, the communication control device 17 is included in the monitoring device 1; however, the communication control device 17 is not limited to be disposed therein and may be disposed within a communication path between the monitoring device 1 and the external device and may be disposed, for example, outside the monitoring device 1.

In the present embodiment, the first reception control unit 13 is attachable to and detachable from the second reception control unit 14. Moreover, the first reception control unit 13 is attachable to the external device which is different from a device (in the present embodiment, the monitoring device 1) mounted with the second reception control unit 14. This allows the first reception control unit 13 to be disposed remotely from the second reception control unit 14 via a communication cable.

In the present embodiment, the first transmission control unit 15 is attachable to and detachable from the monitoring device 1. Moreover, the first transmission control unit 15 is attachable to the external device which is different from the device (in the present embodiment, the monitoring device 1) mounted with the second transmission control unit 16. This allows the first transmission control unit 15 to be disposed remotely from the second transmission control unit 16 via a communication cable.

When various settings or an alarm value having been set to the monitoring device 1 is changed by the external device (PC 2 or host control device 3), the communication control device 17 is input with, from the external device, an output limitation releasing signal (exemplary second digital data signal) for releasing limitation on output of a data signal to the monitoring device 1 prior to reception (input) of a data signal (exemplary first digital data signal) of setting data to be output to the monitoring device 1.

Thereafter, the communication control device 17 converts the input output limitation releasing signal into an analog signal (hereinafter referred to as analog data signal). Next, the communication control device 17 validates the data signal to be output to the monitoring device 1 when the analog data signal satisfies a predetermined condition (when a voltage corresponding to the analog data signal coincides with a predetermined output permission voltage). On the other hand, the communication control device 17 invalidates the data signal to be output to the monitoring device 1 when the analog data signal does not satisfy the predetermined condition (when the voltage corresponding to the analog data signal does not coincide with the predetermined output permission voltage). When the data signal to be output to the monitoring device 1 is invalidated, and thereafter if the output limitation releasing signal is then repeatedly input, and the analog data signal converted into from the output limitation releasing signal having been input does not satisfy the predetermined condition successively for a predetermined number of times (e.g. twice), the communication control device 17 transmits alarm information to the external device and prohibits input of the output limitation releasing signal.

This allows for invalidating setting data for the monitoring device 1 by invalid access to the monitoring device 1 and thereby preventing that important information such as various settings or an alarm value having been set to the monitoring device 1 from being overwritten when the predetermined output permission voltage to be compared to the voltage corresponding to the analog data signal is not solved. Therefore, security of the monitoring device 1 can be ensured while a system including the monitoring device 1 (e.g. power generation system such as a nuclear power plant) can be prevented from falling into chaos.

Figure 2:
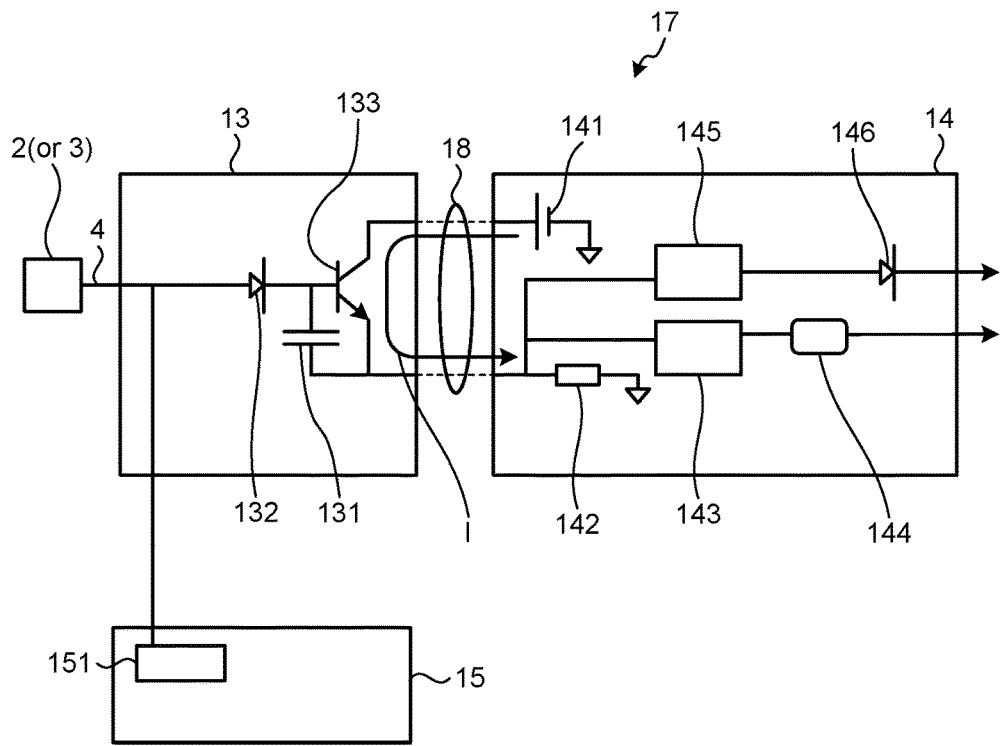
FIG. 2 is a diagram illustrating hardware configurations of first and second reception control units included in a communication control device according to the first embodiment.

Next, specific configurations of the first and second reception control units 13 and 14 in the communication control device 17 included in the cybersecurity system according to the present embodiment will be described with reference to FIG. 2. FIG. 2 is a diagram illustrating hardware configurations of the first and second reception control units included in the communication control device according to the first embodiment.

In the present embodiment, the first reception control unit 13 includes, as illustrated in FIG. 2, a capacitor 131 charged by the output limitation releasing signal (or data signal) input from the external device via the communication cable 4, a rectifying element (diode) 132 for preventing backflow of a current to the external device from the capacitor 131, and a bipolar transistor 133 where a charging voltage of the capacitor 131 is applied to a base thereof. In the present embodiment, as illustrated in FIG. 2, the first transmission control unit 15 transmits, to the external device via the communication cable 4, a digital signal (a signal to be transmitted by the monitoring device 1 to the external device such as a data signal of a measurement result of vibration, eccentricity, elongation, elongation difference, revolution, etc. of a rotor, casing, or the like included in a monitoring target device) modulated by a modulation unit 151 included in the first transmission control unit 15.

In the present embodiment, a collector of the bipolar transistor 133 is connected to a battery 141 while an emitter thereof is connected to an A/D conversion circuit 143 and a demodulator 145. The battery 141, A/D conversion circuit 143, and demodulator 145 will be described later. Also, the bipolar transistor 133 outputs a current I corresponding to the charging voltage applied to the base thereof by the capacitor 131. As a result, the capacitor 131 and bipolar transistor 133 convert the voltage, corresponding to the analog data signal which is an analog signal having been converted into from the output limitation releasing signal, into a current and thereby outputs the current. In the present embodiment, therefore, the first reception control unit 13 functions as a converter that converts the output limitation releasing signal input from the external device into the analog data signal and thereby outputs the signal. Also, the capacitor 131 and bipolar transistor 133 converts the voltage, corresponding to the analog signal having been converted into from the data signal, into a current and thereby outputs the current.

Here, the reason for converting the voltage corresponding to the analog signal having been converted into from the output limitation releasing signal (or data signal) into the current I in the first reception control unit 13 is to prevent that, when each of the first reception control unit 13 and second reception control unit 14 is mounted to separate devices, the analog signal having been converted into from the output limitation releasing signal (or data signal) cannot be output to the second reception control unit 14 with a high accuracy due to a voltage drop of the voltage corresponding to the analog signal having been converted into from the output limitation releasing signal (or data signal) due to a resistance in a communication cable connecting the first reception control unit 13 and second reception control unit 14.

The second reception control unit 14 includes, as illustrated in FIG. 2, the battery 141 connected to the collector of the bipolar transistor 133 included in the first reception control unit 13, an I/V conversion load resistance 142 for clarifying a logic level of the digital signal converted into from the analog data signal by the A/D conversion circuit 143, which will be described later, the A/D conversion circuit 143 for converting into a voltage based on the current I output from the bipolar transistor 133 (in other words, the A/D conversion circuit 143 for converting the analog data signal output from the bipolar transistor 133 in the first reception control unit 13 into a digital signal), a voltage comparison circuit 144 for invalidating a data signal input from the external device when the voltage (voltage corresponding to the digital signal converted into from the analog data signal) converted into by the A/D conversion circuit 143 does not coincide with the predetermined output permission voltage and validating the data signal input from the external device when the voltage converted into by the A/D conversion circuit 143 coincides with the predetermined output permission voltage, and the demodulator 145 for extracting (demodulating) the data signal from the current I (current I converted into from the voltage corresponding to the analog signal of the data signal) output from the bipolar transistor 133, and a backflow prevention diode 146 for preventing backflow of a signal (signal to be transmitted from the monitoring device 1 to the external device) input to the communication control device 17 from the monitoring device 1 to the second reception control unit 14.

In the present embodiment, the second reception control unit 14 functions as a controller which invalidates the data signal when the voltage corresponding to the analog data signal does not coincide with the predetermined output permission voltage and validates the data signal when the voltage corresponding to the analog data signal coincides with the predetermined output permission voltage. Here, the case where the voltage corresponding to the analog data signal coincides with the predetermined output permission voltage includes a case where the voltage corresponding to the analog data signal is within a predetermined voltage range in relation to the output permission voltage. Also, in the present embodiment, the communication control device 17 outputs, to the monitoring device 1, the output limitation releasing signal and the data signal input from the external device using the same communication path and thus the data signal is also converted into an analog signal once and then demodulated into the digital signal again for output in a similar manner to that for the output limitation releasing signal. However, the data signal may be output to the monitoring device 1 without being converted into an analog signal by providing a communication path dedicated to the data signal.

Figure 3:
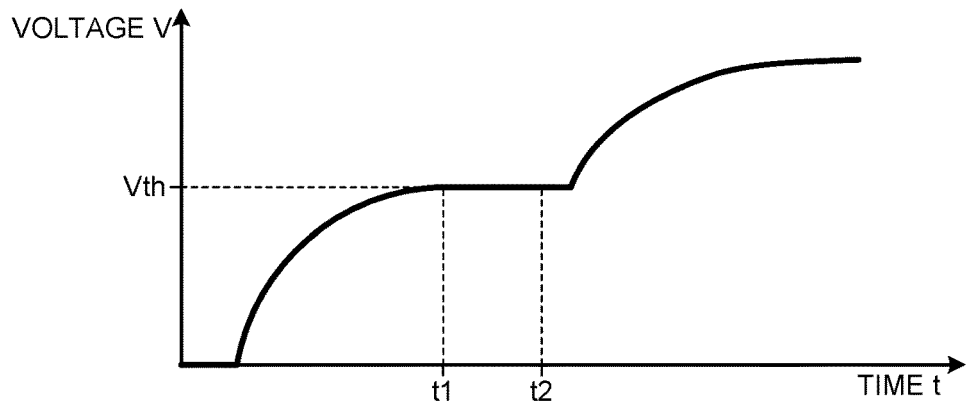
FIG. 3 is a diagram for explaining reception processing of setting data by the communication control device according to the first embodiment.

Next, reception processing of setting data by the communication control device 17 according to the present embodiment will be described with reference to FIGS. 2 and 3. FIG. 3 is a diagram for explaining reception processing of setting data by the communication control device according to the first embodiment.

In the cybersecurity system according to the present embodiment, as illustrated in FIG. 3, an output limitation releasing signal C is input to the monitoring device 1 prior to input of a data signal D to the monitoring device 1 when the data signal D of setting data is input to the monitoring device 1 from the external device. When the output limitation releasing signal C is input, charging of the capacitor 131 in the first reception control unit 13 is initiated. When charging of the capacitor 131 is initiated, the bipolar transistor 133 is applied with the charging voltage of the capacitor 131 from the base thereof and outputs, to the second reception control unit 14, the current I corresponding to the charging voltage of the capacitor 131.

The A/D conversion circuit 143 in the second reception control unit 14 converts the current I output from the bipolar transistor 133 into a voltage V. The current I output from the bipolar transistor 133 increases as the charging voltage of the capacitor 131 increases and thus the voltage V output from the A/D conversion circuit 143 increases accordingly. As illustrated in FIG. 3, the voltage comparison circuit 144 validates the data signal D (data signal D output from the demodulator 145) input after the output limitation releasing signal C when the current I output from the bipolar transistor 133 increases and thereby the voltage V at time t1 output from the A/D conversion circuit 143 coincides with a predetermined output permission voltage Vth.

In the present embodiment, the voltage comparison circuit 144 commands the monitoring device 1 to execute processing corresponding to the data signal D output from the demodulator 145 and thereby validates the data signal D output from the demodulator 145. For example, when a resistance value of the I/V conversion load resistance 142 is 250 Ω and the predetermined output permission voltage Vth is 3.0 V, the voltage comparison circuit 144 validates the data signal D output from the demodulator 145 when the current I output from the bipolar transistor 133 equals 12 mA while the voltage V output from the A/D conversion circuit 143 equals 3.0 V since the voltage V output from the A/D conversion circuit 143 coincides with the predetermined output permission voltage Vth.

On the other hand, the voltage comparison circuit 144 invalidates the data signal D output from the demodulator 145 when the voltage V (voltage V output from the A/D conversion circuit 143) based on the current I output from the bipolar transistor 133 does not coincide with the predetermined output permission voltage Vth (specifically, when the voltage V does not reach the predetermined output permission voltage Vth or the voltage V exceeds the predetermined output permission voltage Vth). In the present embodiment, the voltage comparison circuit 144 commands the monitoring device 1 to prohibit processing corresponding to the data signal D output from the demodulator 145 and thereby invalidates the data signal D output from the demodulator 145.

Meanwhile, the current I output from the bipolar transistor 133 varies according to the charging voltage of the capacitor 131 as described above. The charging voltage of the capacitor 131 further varies according to a duty ratio of the output limitation releasing signal C input from the external device. That is, the current I output from the bipolar transistor 133 is dependent on the duty ratio of the output limitation releasing signal C input from the external device.

Therefore, in the communication control device 17 according to the present embodiment, even when a content of data shown by the output limitation releasing signal C is different, the data signal D is validated when the duty ratio of the output limitation releasing signal C input from the external device is such that the voltage V based on the current I output from the bipolar transistor 133 equals the predetermined output permission voltage Vth. This allows for mitigating possibilities that the data signal D input by an invalid access from the external device is validated as long as such a duty ratio that the voltage V based on the current I output from the bipolar transistor 133 equals the predetermined output permission voltage Vth is not solved by validating the data signal D using the output limitation releasing signal C with data a content of which is different each time the data signal D is input from the external device. Thus, security of the monitoring device 1 can be ensured.

Also, in the present embodiment, the voltage comparison circuit 144 validates the data signal D output from the demodulator 145 when the voltage V output from the A/D conversion circuit 143 coincides with the predetermined output permission voltage Vth continuously for a predetermined period of time (as illustrated in FIG. 3, when the voltage V equals to the predetermined output permission voltage Vth at time t1 and continues to be equal to the predetermined output permission voltage Vth until time t2, when a predetermined period of time has passed). This prevents validation of the data signal D output from the demodulator 145 when the voltage V output from the A/D conversion circuit 143 temporarily equals to the predetermined output permission voltage Vth by input of a signal having a duty ratio larger than that of the output limitation releasing signal C that allows the A/D conversion circuit 143 to output the voltage V equal to the predetermined output permission voltage Vth.

In this manner, according to the communication control device 17 of the first embodiment, possibility that, the data signal D input by an invalid access from the external device is validated, can be reduced, thereby allowing for ensuring security of the monitoring device 1.

Second Embodiment

The present embodiment is an example where output of a data signal to a monitoring device 1 is prohibited and thereby the data signal is invalidated when a voltage corresponding to an analog data signal having been converted into from an output limitation releasing signal does not coincide with a predetermined output permission voltage and output of the data signal to the monitoring device 1 is permitted and thereby the data signal is validated when the voltage corresponding to the analog data signal having been converted into from the output limitation releasing signal coincides with the predetermined output permission voltage. In the descriptions below, description on a configuration similar to that of the first embodiment will be omitted.

Figure 4:
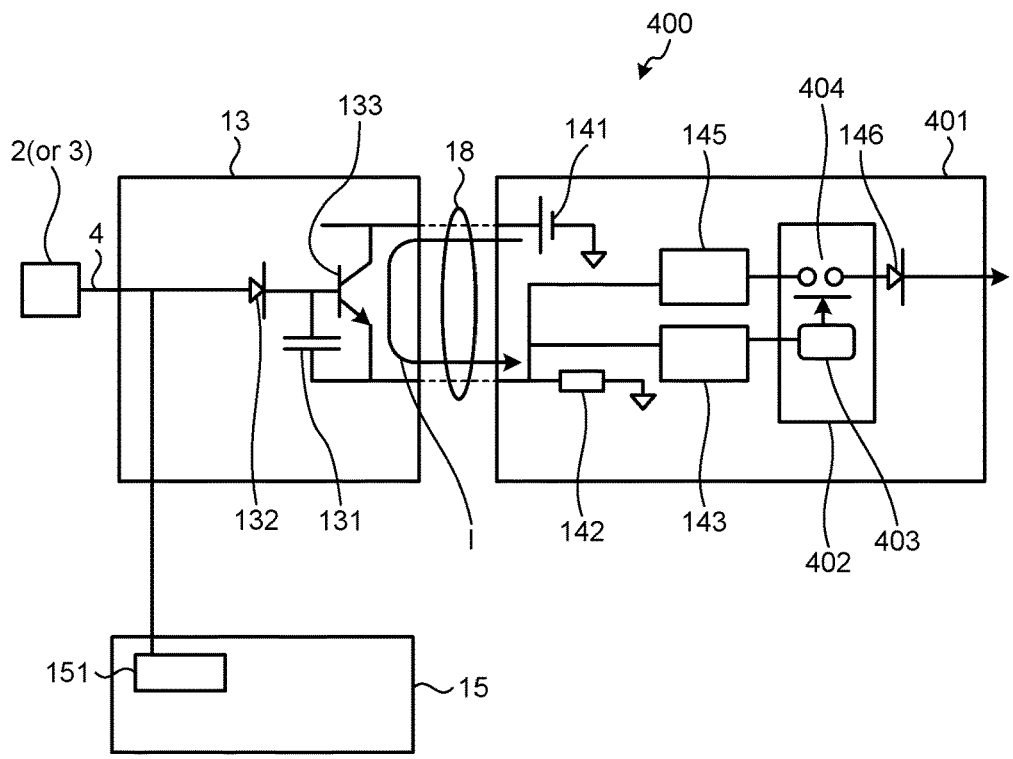
FIG. 4 is a diagram illustrating hardware configurations of first and second reception control units included in a communication control device according to a second embodiment.

FIG. 4 is a diagram illustrating hardware configurations of first and second reception control units included in a communication control device according to a second embodiment. A second reception control unit 401 in a communication control device 400 according to the present embodiment includes, as illustrated in FIG. 4, a battery 141, an I/V conversion load resistance 142, an A/D conversion circuit 143, a demodulator 145, a backflow prevention diode 146, and an output controller 402 for prohibiting output of the data signal input from the external device to the monitoring device 1 when the voltage having been converted into by the A/D conversion circuit 143 (voltage corresponding to a digital signal having been converted into from the analog data signal) does not coincide with the predetermined output permission voltage and permitting output of the data signal input from the external device to the monitoring device 1 when the voltage having been converted into by the A/D conversion circuit 143 coincides with the predetermined output permission voltage.

In the present embodiment, the output controller 402 includes a switch unit 404 capable of prohibiting or permitting output of the data signal extracted by the demodulator 145 to the monitoring device 1, and a voltage comparison circuit 403 for prohibiting output of the data signal by turning off the switch unit 404 when the voltage having been converted into by the A/D conversion circuit 143 does not coincide with the predetermined output permission voltage and permitting output of the data signal by turning on the switch unit 404 when the voltage having been converted into by the A/D conversion circuit 143 coincides with the predetermined output permission voltage.

In this manner, the communication control device 400 of the second embodiment can provide similar effects to those of the first embodiment.

Third Embodiment

The present embodiment is an example where the first reception control unit includes a D/A converter for converting an output limitation releasing signal into an analog data signal and a bipolar transistor, to be applied with a voltage corresponding to the analog data signal having been converted into by the D/A converter from a base thereof, for outputting a current corresponding to the voltage. In the descriptions below, description on a configuration similar to that of the first embodiment will be omitted.

Figure 5:
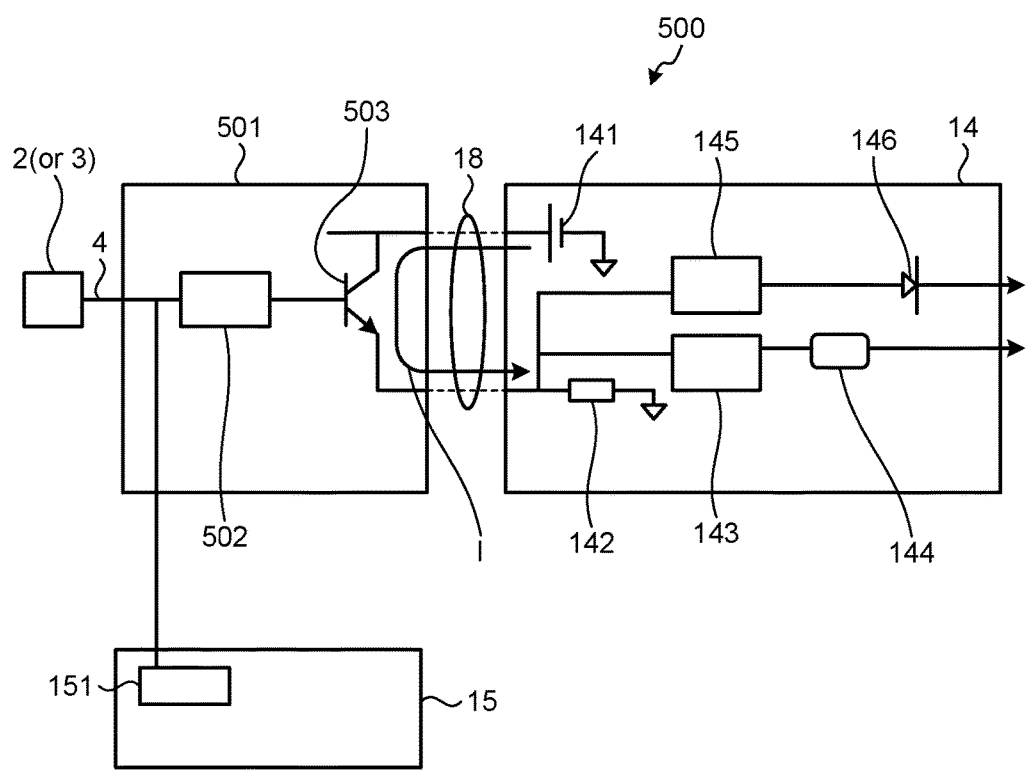
FIG. 5 is a diagram illustrating hardware configurations of first and second reception control units included in a communication control device according to a third embodiment.

FIG. 5 is a diagram illustrating hardware configurations of first and second reception control units included in a communication control device according to a third embodiment. A first reception control unit 501 in a communication control device 500 according to the present embodiment includes, as illustrated in FIG. 5, a D/A conversion circuit 502 for converting the output limitation releasing signal input from an external device via a communication cable 4 into an analog data signal and a bipolar transistor 503, to be applied with a voltage corresponding to the analog data signal having been converted into by the D/A conversion circuit 502 from a base thereof, for outputting a current I corresponding to the voltage. Moreover, in the present embodiment, the D/A conversion circuit 502 converts a data signal input from the external device into an analog signal. Furthermore, the bipolar transistor 503 is applied with a voltage corresponding to the analog signal having been converted into from the data signal by the D/A conversion circuit 502 from a base thereof and outputs the current I corresponding to the voltage. In this case, security of the monitoring device 1 can be enhanced by changing a predetermined output permission voltage as appropriate.

In this manner, according to the communication control device 500 of the third embodiment, when the predetermined output permission voltage to be compared to the voltage corresponding to the analog data signal having been converted into from the output limitation releasing signal by the D/A conversion circuit 502 is not solved, output of setting data for the monitoring device 1 by invalid access to the monitoring device 1 can be prevented, thereby preventing that important information such as settings or an alarm value having been set to the monitoring device 1 is overwritten. Therefore, security of the monitoring device 1 can be ensured while a system including the monitoring device 1 can be prevented from falling into chaos.

Fourth Embodiment

The present embodiment is an example where output of a data signal to a monitoring device 1 is prohibited and thereby the data signal is invalidated when a voltage corresponding to an analog data signal having been converted into from an output limitation releasing signal does not coincide with a predetermined output permission voltage and output of the data signal to the monitoring device 1 is permitted and thereby the data signal is validated when the voltage corresponding to the analog data signal having been converted into from the output limitation releasing signal coincides with the predetermined output permission voltage. In the descriptions below, descriptions on a configuration similar to that of the second or third embodiment will be omitted.

Figure 6:
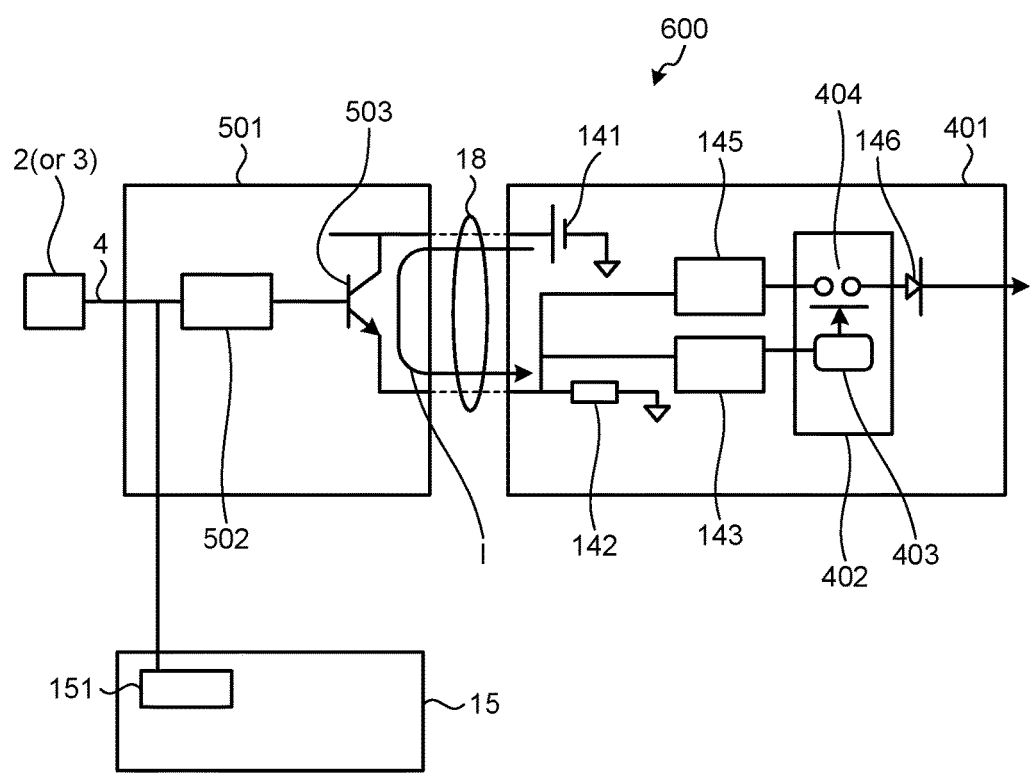
FIG. 6 is a diagram illustrating hardware configurations of first and second reception control units included in a communication control device according to a fourth embodiment.

FIG. 6 is a diagram illustrating hardware configurations of first and second reception control units included in a communication control device according to a fourth embodiment. A communication control device 600 according to the present embodiment includes the first reception control unit 501 of the third embodiment and the second reception control unit 401 of the second embodiment.

In this manner, the communication control device 600 of the fourth embodiment can provide similar effects to those of the third embodiment.

As described above, according to the first to fourth embodiments, security of the monitoring device 1 can be ensured while a system including the monitoring device 1 can be prevented from falling into chaos.

Some embodiments of the present invention have been described; however, these embodiments have been proposed as examples and are not intended to limit the scope of the invention. These novel embodiments can be carried out in other various embodiments and may include various omissions, replacement, or variation within a scope not departing from the principals of the invention. These embodiments or variations thereof are included in the scope or principals of the invention and also included in a scope equivalent to aspects of the invention described in the claims.

What is claimed is:

1. A communication control device comprising: a converter configured to be input with a second digital data signal prior to input of a first digital data signal and to output an analog data signal which is an analog signal converted from the second digital data signal, the first digital data signal being output to a destination device; and a controller configured to invalidate the first digital data signal when a voltage corresponding to the analog data signal does not coincide with a predetermined output permission voltage and to validate the first digital data signal when the voltage corresponding to the analog data signal coincides with the predetermined output permission voltage.

2. The communication control device according to claim 1, wherein the controller prohibits output of the first digital data signal to the destination device when invalidating the first digital data signal and permits output of the first digital data signal to the destination device when validating the first digital data signal.

3. The communication control device according to claim 1, wherein the converter converts the voltage corresponding to the analog data signal into a current and thereby outputs the current, and the controller invalidates the first digital data signal when a voltage based on the current output from the converter does not coincide with the predetermined output permission voltage and to validate the first digital data signal when the voltage based on the current output from the converter coincides with the predetermined output permission voltage.

4. The communication control device according to claim 3, wherein the converter includes a capacitor configured to be charged by the second digital data signal and a bipolar transistor configured to be applied with a charging voltage of the capacitor from a base thereof and to output a current corresponding to the charging voltage.

5. The communication control device according to claim 3, wherein the converter comprises a D/A converter configured to convert the second digital data signal into the analog data signal and a bipolar transistor configured to be applied with the voltage corresponding to the analog data signal converted into by the D/A converter from a base thereof and to output a current corresponding to the voltage.

6. The communication control device according to claim 1, wherein the controller validates the first digital data signal when the voltage corresponding to the analog data signal coincides with the predetermined output permission voltage continuously for a predetermined period of time.

7. The communication control device according to claim 3, wherein,
the communication control device includes a device mounted with the controller and an external device which is different from the device,
the converter is mounted to the external device, and
the device is connected to the external device via a communication cable.

* * * * *